United States Patent [19]

Pommer, II

[11] Patent Number: 4,647,787
[45] Date of Patent: Mar. 3, 1987

[54] BACKUP BATTERY POWER SUPPLY FOR MICROPROCESSOR BASED TELEPHONES

[75] Inventor: Karl E. Pommer, II, Los Alamos, N. Mex.

[73] Assignee: GTE Communication Systems Corp., Northlake, Ill.

[21] Appl. No.: 698,207

[22] Filed: Feb. 4, 1985

[51] Int. Cl.⁴ .................................................. H02J 9/06
[52] U.S. Cl. ........................................ 379/413; 307/66; 307/64; 379/387
[58] Field of Search .................... 307/64, 66; 179/70, 179/77, 81 R, 1.1, 2 BC

[56] References Cited

U.S. PATENT DOCUMENTS

| | | | |
|---|---|---|---|
| 3,614,334 | 10/1971 | Bonvallet | 179/81 R X |
| 3,686,444 | 8/1972 | Stevenson | 179/81 R |
| 4,064,366 | 12/1977 | Wheatley et al. | 179/81 R X |
| 4,327,298 | 4/1982 | Burgin | 307/66 |
| 4,532,382 | 7/1985 | Pommer, II | 179/81 R |
| 4,547,629 | 10/1985 | Corless | 179/81 R |

FOREIGN PATENT DOCUMENTS

| | | |
|---|---|---|
| 3031860 | 4/1982 | Fed. Rep. of Germany . |
| 2366755 | 4/1978 | France . |

Primary Examiner—William M. Shoop, Jr.
Assistant Examiner—Sharon D. Logan
Attorney, Agent, or Firm—Robert J. Black

[57] ABSTRACT

A circuit arrangement for use in telephone instruments which require battery backup for memory retention and microprocessor operation during such procedures as pulse dial address signalling where no power can be supplied by the telephone subscriber's line. Bipolar solid state circuitry may be used to provide the necessary backup power supply during these periods.

7 Claims, 2 Drawing Figures

BACKUP BATTERY POWER SUPPLY FOR MICROPROCESSOR BASED TELEPHONES

CROSS REFERENCE TO RELATED APPLICATION

This application is related to my co-pending applications entitled A Temperature-Dependent Voltage Reference Caparator-Diode (Ser. No. 670,508), An Analog Process Controller with a Digital Monitor (Ser. No. 670,094) and Self Adjusting Bias Power Supply for Line Powered Telephones (Ser. No. 670,509) all of which were filed on Nov. 13, 1984.

BACKGROUND OF THE INVENTION

1. Field of the Invention

The present invention is applicable to telephone instruments and more particularly to telephone instruments which require battery backup for memory retention and microprocessor operation during zero line power conditions or during loop signaling. The invention may also find applicability as battery backup power for computer systems or security systems.

2. Background Art

The basic circuitry used in many prior microprocessor based telephones powered by the telephone subscriber's line or a backup battery supply is like that shown in FIG. 1 of the attached drawings. As shown diode isolation is used to decouple the battery supply (B) from the $V_{DD}$ supply whenever the $V_{DD}$ voltage supply exceeds the battery supply voltage. This increased $V_{DD}$ supply voltage represents a condition where sufficient power can be obtained from the telephone subscriber line. Telephones employing such circuitry include the "Duofone 160" marketed by Radio Shack Incorporated and the Electronic Resources Ltd., type IT2005 telephone. A similar technique is used to power a combination repertory dialer within the "Linear II" telephone manufactured by GTE Communication Systems Corporation and described in U.S. patent application Ser. No. 558,128 by E. Boeckmann, entitled "Protection Circuitry for Subscriber's Telephone Circuit Equipped with Repertory Memory". A similar technique is also used on the +5 volt DC regulated voltage supply, powered from a 110 volt AC power line source for the random access memory (RAM) included in the "Featurephone" also manufactured by GTE Communication Systems Corporation. In this instance, a 3.6 volt battery is used to maintain memory during AC power failures.

The prior art does not appear to include a repertory dialing telephone which maintains the same regulated DC supply voltage regardless of the energy source. The aforementioned circuits exhibit a characteristic voltage difference when the energy source has changed from a backup battery to the external AC power line or to the telephone subscriber line. Such an event can have a degrading effect upon the performance of multiplexed liquid crystal displays (LCD's) which may be incorporated in such telephones. Normally the contrast exhibited by these displays is maintained by a temperature compensated voltage drop between the DC voltage supply and the voltage supply inputs to the integrated circuit LCD driver. Such a compensating voltage drop may include an adjustable resistor and a thermistor as described for the HLCD 0515, LCD driver in the 1982 CMOS data book for Hughes Solid State Products. As a result, this change in the DC voltage supply is reflected by a corresponding change in the AC drive signals to the LCD display and a subsequent change in the contrast of the display.

SUMMARY OF THE INVENTION

The present invention is coupled to the telephone subscriber line by the usual hookswitch and diode bridge rectifier combination. This, in connection with an appropriate series voltage regulating circuit such as that described in my co-pending application entitled "Self Adjusting Bias Power Supply for Line Powered Telephones" permits a telephone to be powered by the subscriber line with a built in change over to the inventions backup battery supply as dictated by either the available input voltage on the subscriber line or a controlling logic signal.

In the circuitry of the present invention a first resistor and capacitor are coupled to the positive side of the telephone subcriber's line to form a low pass filter. The filter's output is then coupled to the base of an emitter follower NPN type transistor by an optional first diode. The associated emitter resistor is also connected to the base of a first PNP transistor. The collector of the first NPN transistor is connected to the $V_{DD}$ voltage supply output terminal and a high value second capacitor. The base of the aforementioned first NPN transistor is also connected to the collector of a common emitter seond NPN transistor whose base is coupled to a "Battery Power Enable" logic signal by a voltage divider consisting of a third and fourth resistors. The positive terminal of the battery supply is connected to a high value fifth resistor which is in turn connected to a second diode whose cathode is tied to the $V_{DD}$ voltage supply. The node between the aforementioned fifth resistor and the anode of the second diode also connects to the anode of a third diode whose cathode connects to the base of a third NPN transistor. The collector of this NPN transistor connects to the $V_{DD}$ voltage supply. Optionally the second diode can be replaced by an open circuit and the third diode replaced by a short circuit. In this event the base collector diode of the third NPN transistor assumes the function of the second diode and the NPN transistor's emitter-base diode assumes the function of the third diode. The emitter of the third NPN transistor is connected to the emitter of the first PNP transistor. The PNP transistor's collector is coupled to the base of common emitter fourth NPN transistor by a sixth resistor. The fourth NPN transistor's base is also connected to the output of the voltage regulating circuit represented by the collector of a common emitter fifth NPN transmittor. The input for this voltage regulated circuit (not shown) is the $V_{DD}$ voltage supply. The collector of the fourth NPN transistor is connected to the base of a gating second PNP transistor whose emitter and collector are connected between the battery supply and the $V_{DD}$ voltage supply, respectively. The PNP transistor's base emittor diode may also be shunted by an optional seventh resistor.

In operation, considering first the condition where no input power is available for the telephone subscriber loop, battery voltage is boot-strapped through a series third diode and fifth resistor into the base of a third NPN transistor for a self-start-up mode of operation. The base-emitter diode of the NPN transistor turns on to provide sufficient base current to the emitter of a first PNP transistor sufficient to turn on the device. A second diode, similarly boot-strapped from the battery to the collector to the third NPN transistor also provides current for slow charging of a filter-storage, second capacitor connected to the $V_{DD}$ supply line to start bringing up the $V_{DD}$ supply voltage. The first PNP transistor's collector now provides positive bias to a fourth NPN transistor connected in the common emitter configuration with its collector controlling the base of the battery powered PNP gating, second transistor. As soon as the fourth NPN transistor turns on sufficiently, the PNP gating transistor comes on allowing the battery to power the circuit up further until the comparator's threshold voltage is reached. As the comparator's threshold is exceeded, a regulating fifth NPN transistor is turned on and starts to negatively bias the aforementioned fourth NPN transistor, which is connected to the common-emitter configuration controlling the base of the gating, second PNP transistor used to limit the battery current, thereby regulating the $V_{DD}$ voltage supply.

Next, considering the condition that sufficient subscriber loop power is available, the associated tip to ring input voltage is sensed through a low pass filter consisting of a series first input resistor connected to a first filter capacitor via an optional first diode. The diode's cathode connects to the base of a first NPN transistor which turns on and connects the $V_{DD}$ supply through its collector to a second resistor attached to its emitter. This resistor also connects to the base of the first aforementioned PNP transistor which now turns off due to the increase in bias voltage on the base of the PNP transistor. As a result, positive bias is removed from the base of the common-emitter connected, forth NPN transistor which, in turn, removes bias current for the base of the second PNP transistor. This gating PNP transistor turns off, leaving the battery disconnected so that full operating power can now be derived from the telephone subscriber line. In addition, the first PNP transistor prevents the flow of battery current through the aforementioned bootstrap, self start up bias circuit. The low pass filter serves to prevent the battery from being disconnected as a result of high instantaneous subscriber loop input voltages due especially to high frequency signals such as voice signals or DTMF signaling tones. In the event that the subscriber loop's voltage drops below the circuit's threshold, the above process reverses automatically to again allow battery current to flow to the $V_{DD}$ supply.

At certain times such as during pulse dial address signaling, it is desirable to switch to battery power during the break periods to minimize the conduction of loop current. This is accomplished by the microprocessor's transistion to a logic "one" or positive high voltage level which turns on the base of a second NPN transistor which is common-emitter connected, to turn off the aforementioned first NPN transistor (overriding the input loop voltage) and thereby reversing the loop sense "on" condition to return automatically to battery power.

Accordingly it is the object of the present invention to define a regulated DC voltage supply for a telephone instrument which maintains the same regulated output voltage regardless of the energy source connected to the circuit. Furthermore a means of temperature compensation for the contrast variations of a liquid crystal displays are also included within the circuit. These objects are met by the present circuitry which features the ability to switch the power supply "on" under microprocessor control and the ability to sense the telephone subscriber lines DC input voltage to shut off the battery power supply when the subscriber line can be used as a power source. Also included in the present design is the ability to provide built in temperature compensation for liquid crystal displays, the ability to maintain the same regulated output voltage when the energy source changes from battery to the subscriber line or vice-versa and a bootstrap self start up bias circuit for the battery power supply which switches off when the $V_{DD}$ supply is powered by the subscriber line so that the standby battery current is minimal.

DESCRIPTION OF THE PREFERRED EMBODIMENT

Figure 1:
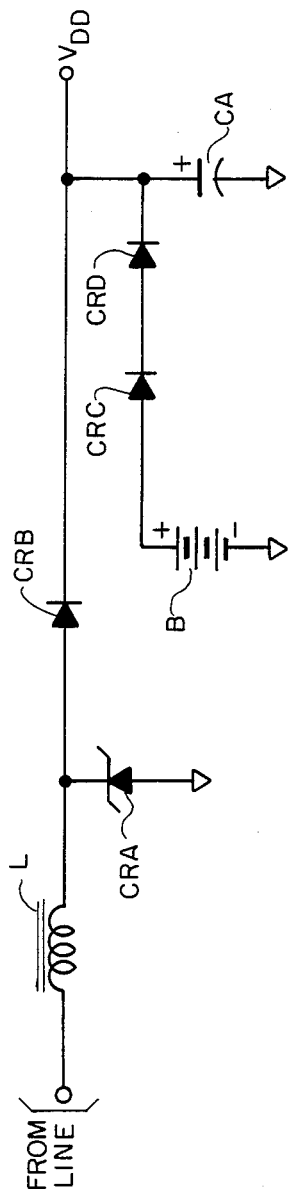
FIG. 1 is a prior art circuit of a line powered telephone with a back up battery power supply.
Figure 2:
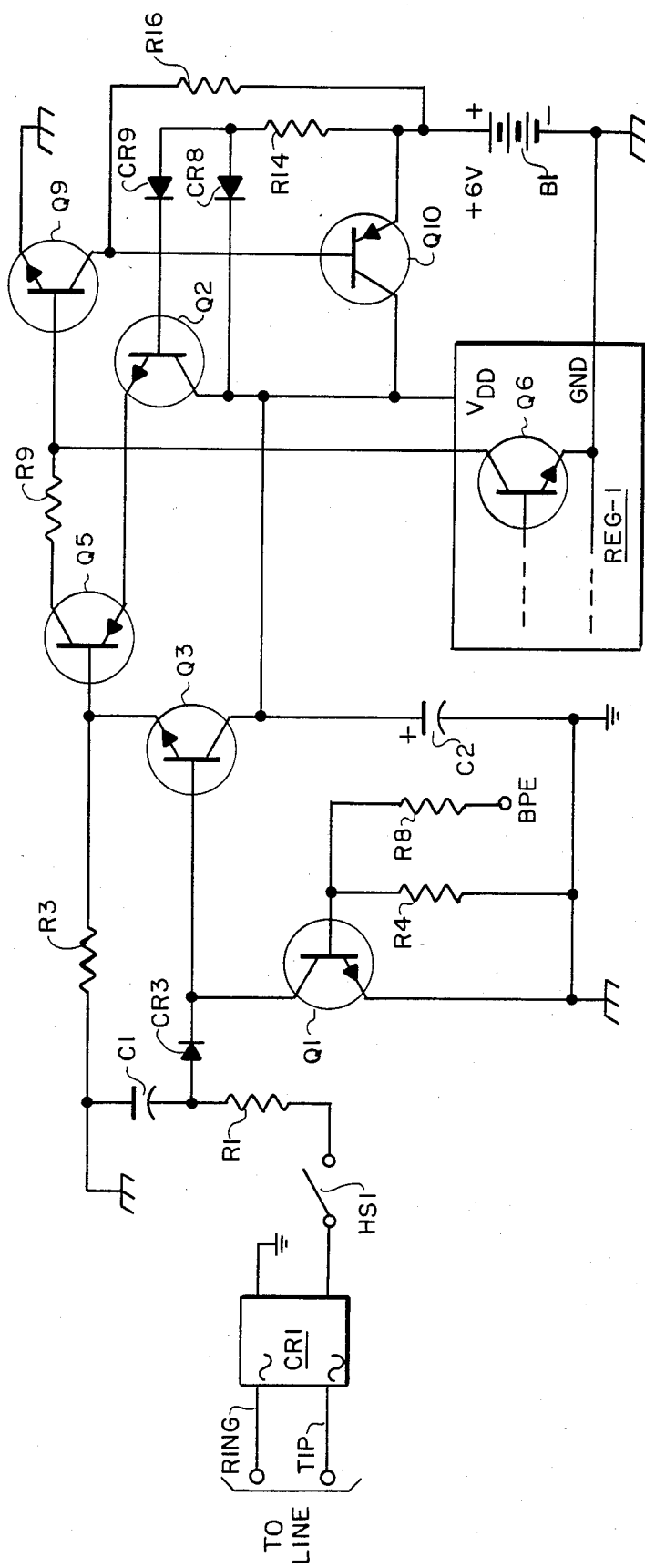
FIG. 2 is simplified schematic of a battery back up supply in accordance with the present invention.

Referring now to FIG. 2, the circuitry of the present invention is shown in its typical application connected to the tip and ring inputs of a telephone subscriber's loop, to a voltage regulating circuit and to an associated logic signal control input designated "BPE" Battery Power Enable input. Resistor R1 and capacitor C1 form a low pass filter whose input is the telephone subscriber's line via diode bridge CR1 and the hookswitch HS-1. The filter's output is coupled to NPN transistor Q3 by either diode CR3 or by means alternatively of a direct connection. The collector and emitter's circuits for transistor Q3 are filter capacitor C2 representing the output for the $V_{DD}$ supply and emitter resistor R3, respectively. Common emitter NPN transistor Q1 is driven by the "BPE" logic signal via a voltage divider made up of resistor R4 and resistor R8. The collector of transistor Q1 is tied to the base of transistor Q3 so that a logic "high" at the BPE input enables the battery power supply. The aforementioned emitter resistor R3 is also connected to the base of PNP transistor Q5. The emitter of transistor Q5 is connected to the emitter of NPN transistor Q2 whose collector is tied to the output of the $V_{DD}$ supply. The base of transistor Q2 is coupled to resistor R14 by either diode CR9 or by means of a direct connection. If diode CR9 is included, as shown, then diode CR8 must be coupled between the $V_{DD}$ supply and resistor R14. Otherwise no connection is made since its function is performed by the base collector diode within NPN transistor Q2. Resistor R14 is, in turn, connected to the positive side of the battery supply. The aforementioned PNP transistor Q5's collector is connected to resistor R9. Resistor R9, in turn, is connected to both the base of NPN transistor Q9 and the output of the voltage regulating circuit, represented by a common emitter NPN transistor Q6. The details of the regulator circuit REG-1 have not been shown as in as much as they do not form a portion of the present invention. The collector of common emitter transistor Q9 is connected to the PNP battery current gating transistor Q10. The emitter and collector of transistor Q10, in turn, are connected to the positive battery supply voltage and the output terminal of the $V_{DD}$ voltage supply, respectively. The emitter-base diode of transistor Q10 may also be shunted by a high value resistor such as resistor R16.

Operation of the circuitry of the present invention will be first described in that case where the input voltage from the tip and ring inputs to the telephone subscriber line are either zero or of insufficient magnitude to turn on transistor Q3. In this case, transistor Q2 provides bootstrap start up bias to transistor Q5 and resistor R3 via diode CR9 which, in turn, is fed through resistor R14 from the plus terminal of the battery. Transistor Q5, in turn, forces transitor Q9 to turn on via resistor R9. As a result, the collector of transistor Q9 conducts current from the base of the PNP gating transistor Q10. This permits the battery to further power up the circuit, charging capacitor C2 and bringing the $V_{DD}$ voltage up to the desired threshold value. During this time, diode CR8 also helps to bring up voltage by charging capacitor C2. Once the threshold voltage of the voltage regulating circuit is exceeded by the output of $V_{DD}$ voltage supply, negative bias from the NPN transistor Q6 starts to turn off transistor Q9 which in turn reduces the bias current supplied to the base of transistor Q10. This action tends to limit battery current thereby regulating the $V_{DD}$ supply voltage.

Given sufficient DC loop voltage to resistor R1 (indicating that power is available from the telephone subscriber line) and that the microprocessor is signaling a logic low to the "BPE" input of the power supply, then transistor Q1 is off and transistor Q3 switched on to apply the $V_{DD}$ voltage supply to resistor R3 and the base of the PNP transistor Q5. As a result, transitor Q5 is turned off and the base emitter diode of transistor Q9 will no longer be biased into the on state via resistor R9. Similarly the flow of bootstrap bias current from the emitter of transistor Q2 is shut off by transistor Q5. Subsequently, transistor Q10, the PNP gating transistor, is no longer biased by transistor Q9 and the flow of battery current to the output of the $V_{DD}$ supply is shut off. The loop power supply circuit (not shown) is then enabled as the sole supply of power to the $V_{DD}$ supply.

In some applications diodes CR8 and CR9 may be replaced by an open circuit and a short circuit, respectively. In this case, the function of diode CR8 is performed by the collector-base diode within NPN transistor Q2. The absence of diode CR9, simply changes the bias voltage on resistor R3 to a higher level when the battery is supplying current to the $V_{DD}$ power voltage supply. It also increases the subscriber line's input voltage this is required to turn on Q3, such that the power source for the $V_{DD}$ voltage supply may be switched from the back up batteries to the telephone subscriber loop.

The batteries are enabled to supply power to the $V_{DD}$ voltage supply in the event that a microprocessor-logic circuit outputs a logic 1 (high voltage level approaching the voltage of $V_{DD}$) via the circuit "BPE" input. In this case, transistor Q1 is turned on forcing transistor Q3 to turn off, regardless of the input voltage applied to resistor R1. If power was previously obtained from the loop, the circuit reverts to the same situation described previously for a low level loop voltage across tip and ring which is insufficient to turn on transistor Q3.

The $V_{DD}$ voltage supply can also be used to compensate for contrast variations exhibited by liquid crystal displays. In this application, the integrated circuit display driver (for example a Hughes solid state products HLCD 0515) is directly connected to the $V_{DD}$ voltage supply. An intervening temperature compensating voltage dropping element such as a PTC thermistor is no longer needed since the voltage regulating circuit can be used to effect the necessary temperature coefficient for the voltage supply to the display driver. A voltage regulating circuit with this characteristic is described by the reference application "A Temperature-Dependent Voltage Reference Comparator/Diode".

While but a single embodiment of the present invention has been shown it will be obvious to those skilled in the art that numerous modifications may be made without departing from the spirit of the present invention which shall be limited only by the scope of the claims appended hereto.

I claim:

1. A battery backup power supply for use with an associated line connected telephone, said battery backup power supply comprising: a regulated voltage input connected to a voltage regulator included in said telephone; a battery; control means including circuit connections to said regulator and to said telephone line, operated in response to a voltage on said telephone line insufficient to power said telephone to connect said battery to said voltage regulator; and a low pass filter connected across said telephone line operated to block voice signals on said telephone line from said control means.

2. A battery backup power supply as claimed in claim 1 wherein: said control means includes an NPN transistor functioning as a gate circuit operated in response to the voltage on said telephone line insufficient to power said telephone, to connect said battery to said voltage regulator included in said telephone.

3. A battery backup power supply as claimed in claim 2 wherein: there is further included a bootstrap circuit operated to render said gating transistor operated.

4. A battery backup power supply as claimed in claim 3 wherein: said bootstrap circuit comprises a first transistor connected to said battery a second transistor connected to said gate and a third transistor connected between said first and second transistors.

5. A battery backup power supply as claimed in claim 1 wherein: said control means further include a logic signal input connected to a source of logic signals included in said telephone; and said control means further operated in response to a logic signal from said source of logic signals, appearing at said logic signal input to operate said control means to connect said battery to said telephone line.

6. A battery backup power supply as claimed in claim 4 wherein: once the voltage of the voltage regulator circuit is exceeded by the output of the backup power supply, a negative bias from the voltage regulator proceeds to turn off said third transistor limiting the current from said battery.

7. A battery backup power supply as claimed in claim 4 wherein: said logic signal input is connected to a voltage divider including an output an connected to a transistor adapted to enable said control means.

* * * * *